UNITED STATES PATENT OFFICE.

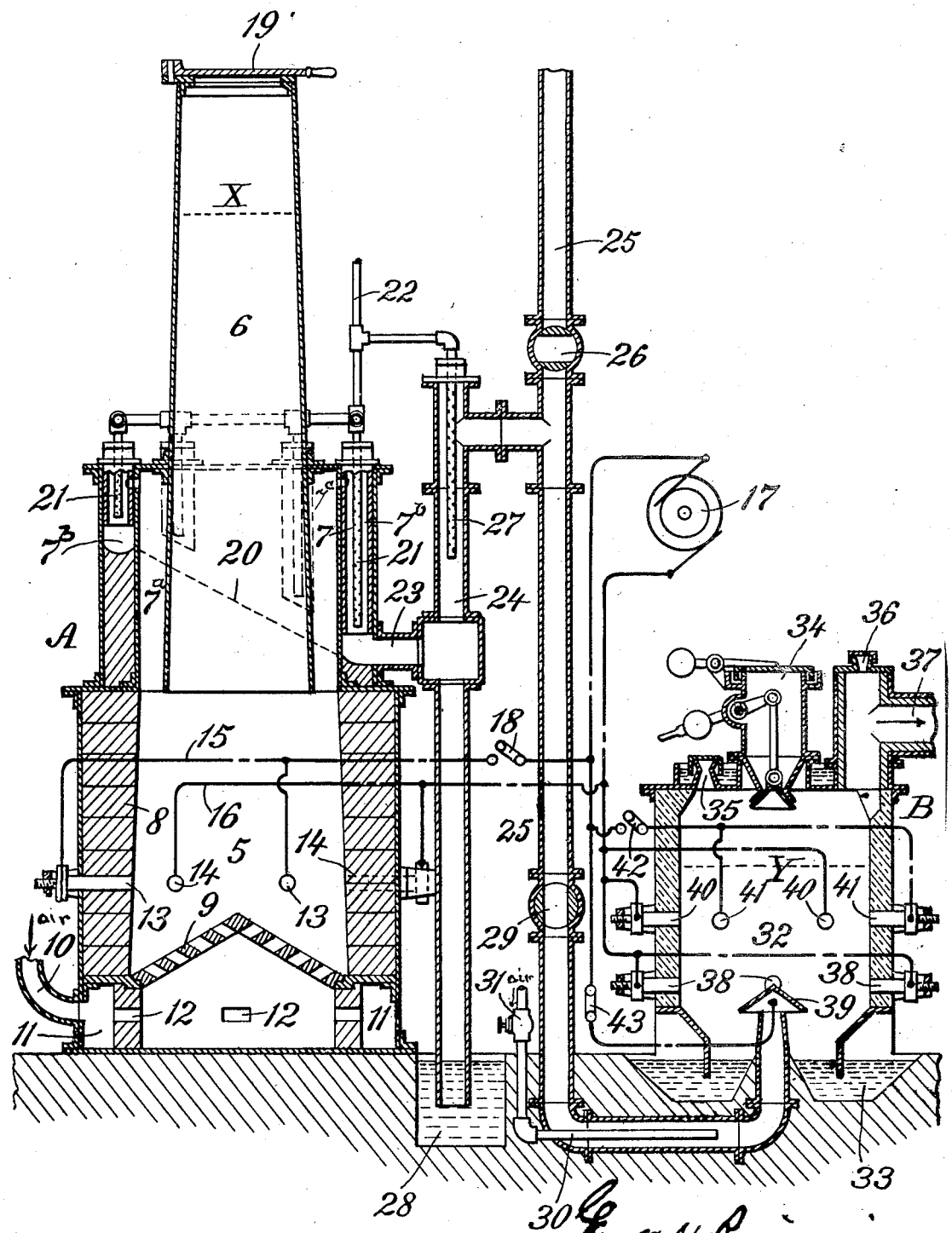

GEORGE HILLARD BENJAMIN, OF NEW YORK, N. Y.

METHOD OF AND APPARATUS FOR PRODUCING GAS.

1,105,241.   Specification of Letters Patent.   Patented July 28, 1914.

Application filed January 13, 1913. Serial No. 741,796.

*To all whom it may concern:*

Be it known that I, GEORGE HILLARD BENJAMIN, a citizen of the United States, residing at New York city, in the county and State of New York, have invented certain new and useful Improvements in Methods of and Apparatus for Producing Gas, of which the following is a specification.

My invention consists in a method of and apparatus for producing gas from coal, sawdust, street refuse, etc.

By reason of my improved method and apparatus, I am able to produce gas cheaply from the substances mentioned, and to enrich the gas by increasing the carbon element therein before delivery to the point of consumption.

The accompanying drawing is illustrative of an apparatus to which my method may be applied, for the production of gas from sawdust.

In the drawing, A represents a gas producer and B a regenerator or recuperator for enriching the gas derived from the producer A. The producer A is designed for the production of gas from sawdust. I wish it understood that any form of producer may be used, such as is common in the production of gas from coal, street refuse, and the like. The producer described consists essentially of a combustion chamber 5, a feed chamber 6, and a gas chamber 7. The combustion chamber 5 is provided with walls 8 inclined from above downward and outward. This construction I find to be preferable, as it prevents choking of the combustion chamber. Located in the bottom of the combustion chamber is an inclined grate 9. Means is provided for feeding air under the grate, consisting of a pipe 10 connected to any suitable source of air supply and discharging into an annular chamber 11, provided with openings 12. Situated in the walls of the combustion chamber are two sets of electrodes 13—14, respectively connected through conductors 15—16 to the terminals of a dynamo electric machine 17.

18 indicates a switch controlling the current delivered to the electrodes. The electrodes 13—14 are shown as arranged equidistant around the combustion chamber. They may, however, be otherwise arranged. The purpose of the electrodes is to provide means for creating a high temperature within the combustion chamber when desired, as hereafter explained.

The feeding chamber 6 is provided with a cover 19. The gas chamber 7 is shown as located above the combustion chamber and consists of two annular chambers $7^a$—$7^b$ which communicate at their tops through openings $7^c$. The bottom 20 of this chamber, is inclined in a downward direction. Situated within the chamber are a series of perforated pipes 21, varying in length in accordance with the depth of the chamber. These pipes are connected to a pipe 22 connected to any source of water supply. The gas chamber is connected at its bottom through a pipe 23 to a vertical pipe 24, which is connected at its upper end to a pipe 25 in which is a controlling valve 26.

Situated in the upper end of the pipe 24 is a perforated pipe 27 connected to the source of water supply pipe 22. The lower end of the pipe 24 is situated in a well 28. The upper end of the pipe 25 is open to the atmosphere. The lower end is situated and adapted to discharge into the bottom of the gas regenerator or recuperator B.

29 indicates a controlling valve near the lower end of the pipe 25. Situated in the lower end of the pipe 25 is a pipe 30 provided with a controlling valve 31. Pipe 30 may be connected to any suitable source of air supply.

The regenerator or recuperator B consists of a recuperator chamber 32, the lower end of which is closed by a water seal or ash pit 33. On the top of the producer is a feed hopper 34, stirring opening 35, and test opening 36.

37 indicates a gas flue from the regenerator or recuperator.

Situated within the recuperator chamber are three series of electrodes; 38 connected to one terminal of the dynamo machine 17 and which coact with a single electrode or terminal 39 connected to the opposite terminal of the dynamo machine, and 40 which are connected to one terminal of the dynamo machine and which coact with electrodes 41 connected to the other terminal of the dynamo machine. Suitable switches 42—43, provide means for controlling the current fed to the electrodes.

My improved method is carried out, and the operation of the apparatus described, may be as follows: Sawdust is charged into the feed chamber 5 of the producer A and fills the combustion and feed chambers up to approximately the point indicated by the dotted line at X. The valve 26 in pipe 25 is then turned to a position opposite to that shown, and a fire lighted in the bottom of the producer and air under pressure driven through the pipe 10 into the annular chamber 11, and thence distributed through the openings 12, through the grate 9 into the bottom of the combustion chamber. The smoke and products of combustion, upon lighting the fire, pass to the gas chamber 7, thence through the pipes 23—24—25 to the atmosphere. After the fire is well established the air pressure is shut off and the valve 26 in pipe 25 turned to the position shown in the drawing. When the air pressure is shut off, the air supplied to the producer A is continued under the suction action of an engine connected to pipe 37 of the recuperator B. As the gas is formed it passes up into the gas chamber 7 and through sprays of water delivered by the perforated pipes 21, the water flowing down the inclined bottom 20 of the gas chamber 7 and thence through pipe 24 into the gas well 28. The water serves to wash the gas of tar. The gas leaves the gas chamber 7 by the pipe 23, passes up pipe 24, where it is again sprayed by the perforated pipe 27, thence by pipe 25 downward to be discharged into the bottom of the gas regenerator or recuperator B. In case it is desired to increase the temperature in the combustion chamber 5, (as is the case in choking up the producer), over that due to the ordinary combustion of the material in the chamber, a current of electricity may be caused to pass between the electrodes 13—14, the material in the chamber acting as a resistance medium.

The gas regenerator or recuperator I prefer to fill with coke or coal up to approximately the level shown by the dotted line Y, which, prior to the introduction of the gas from the producer A has been ignited. Ignition may be accomplished by starting a fire in the ordinary way or causing an electric current to pass between series of electrodes 38 and the single electrode 39, which produces an incandescent zone in the bottom of the producer at approximately the position occupied by the electrodes. If desired, a second incandescent zone may be created by causing a current of electricity to pass between the electrodes 40 and 41.

It will be understood that the coke or coal in the regenerator or recuperator acts as a resistance medium, and that the high temperature created in the regenerator or recuperator serves to disassociate the coke or coal, so that when the gas derived from the producer A, which is largely $CO_2$, is transmitted through the coke or coal in the regenerator or recuperator, it picks up carbon to form $2CO$. As the coke or coal is consumed in the regenerator or recuperator, the ash is drawn out through the ash pit 33, and further coke or coal may be introduced through the hopper 34. With some cokes and coals I find it preferable to introduce a small body of air with the gas, into the bottom of the recuperator through the pipe 30.

It will be observed that by the arrangement of the electrode 39 and electrodes 38 in the bottom of the regenerator or recuperator, the incandescent zone at this point is from electrode 38 to the electrode 39 at one instant, and from the electrode 39 to the electrode 38 at the next instant, across the body of material in the chamber and that by the arrangement of the electrodes 40 and 41, the incandescent zone is between pairs of electrodes and in proximity to the walls of the chamber, and not across the whole body of fuel in the chamber, the center of the body of fuel being practically free for any transmitted electric current, which arrangement is found to be of advantage for the following reasons:

In the lower zone the temperature is across the entire body of fuel, in the upper zone at the sides of the body of fuel; thus the lower zone acts to disassociate the gas entering through the pipe 25, and the upper zone to disassociate the gas following the walls of the furnace, while the fuel at the center of the zone acts to supply carbon to the disassociated gas. At times during the operation of the regenerator or recuperator it may be found desirable to cut out the electric current in the lower or the upper zone, which can be done by means of the controlling switches.

It will be understood by those skilled in the art to which this invention belongs that in the production of gas from sawdust, the production of $CO_2$ is large and variable, and that to convert this gas into a fuel gas, it is necessary to introduce further carbon, which can be accomplished by means of the regenerator or recuperator as described; and that the producer and regenerator or recuperator considered collectively, are the means by which the method of producing a high carbon gas may be carried into effect. Further, that where the gas producer is operated with coal, and the regenerator or recuperator operated with coal, the two devices coact to produce a high carbon gas, in which case the regenerator or recuperator acts not only to improve the quality of the gas derived from the producer A, but also serves as a gas producer, to increase the amount of gas produced. It will be further understood by those skilled in the art, that the gas producer as also the gas regenerator or recuperator are of the type known as suction producers, regenerators or recuperators, and that the gas delivery pipe 37 is assumed to be connected to the suction apparatus, as for instance the induction pipe of a gas engine.

Having thus described my invention, I claim:

1. A method of producing gas, which consists in diasssociating a gas producing body, washing the gas, and passing the gas through a zone of carbonaceous material heated and maintained at a high temperature by the passage of an electric current therethrough whereby $CO_2$ carried by the gas is converted into $2CO$.

2. A method of producing gas, which consists in disassociating a gas producing body such as sawdust, washing out therefrom such substances as may be absorbed or condensed by water, passing the gas through a zone of carbonaceous material heated and maintained at a high temperature by the passage of an electric current therethrough and converting the $CO_2$ carried by the gas into $2CO$.

3. A method of producing gas, which consists in disassociating a gas producing body to form $CO$ and $CO_2$, washing the gas to separate tar and ammonia therefrom, then passing the gas through a zone of carbonaceous material heated to and maintained at a high temperature by the passage of an electric current therethrough, and converting the $CO_2$ of such gas into $2CO$.

4. A method of producing gas, which consists in disassociating a gas producing body to form $CO$ and $CO_2$, washing the substances from such gas which may be absorbed or condensed by water, then passing the gas through a zone of carbonaceous material heated to and maintained at a high temperature by the passage of an electric current therethrough, converting the $CO_2$ by the addition of carbon into $2CO$, and then adding to the originally produced gas, the gas derived from the highly heated carbonaceous material.

5. A method of producing gas, which consists in burning sawdust in a closed suction producer, washing the gas set free to remove therefrom all matters which may be absorbed or condensed by water, passing the gas through a suction regenerator or recuperator containing a zone of carbonaceous material heated to and maintained at a high temperature by the passage of an electric current.

6. An apparatus for producing gas, comprising a suction gas producer, means for washing the produced gas, a suction regenerator or recuperator, and means in said regenerator or recuperator for converting any $CO_2$ gas derived from the gas producer into $2CO$ without the admixture of nitrogen.

7. An apparatus for producing gas, comprising a suction gas producer, means for washing the producer gas, a regenerator or recuperator for converting any $CO$ gas derived from the gas producer into $2CO$ without the admixture of nitrogen.

8. An apparatus for producing gas, comprising a gas producer, means for washing the produced gas, a regenerator or recuperator, and means in said regenerator or recuperator for creating and maintaining a zone of temperature therein sufficiently high to convert any $CO_2$ gas derived from the gas producer into $2CO$ and substantially free from nitrogen.

9. An apparatus for producing gas, comprising a gas producer adapted to produce $CO$ and $CO_2$, means for washing the produced gas, a regenerator or recuperator, means therein for continuously converting the $CO_2$ gas derived from the producer into $2CO$ and for producing $CO$ and substantially free from nitrogen.

10. An apparatus for producing $CO$ gas substantially free from nitrogen, comprising a producer adapted to produce $CO$ and $CO_2$, means for washing the produced gas, a regenerator or recuperator, means in said regenerator or recuperator for creating and maintaining a zone of high temperature therein sufficiently high to convert the $CO_2$ gas derived from the gas producer into $2CO$ and produce $CO$.

11. A method of producing $CO$ gas substantially free from nitrogen, which consists in disassociating a gas producing body to set free $CO$ and $CO_2$, washing these gases, passing these gases through a zone of carbonaceous material heated and maintained at a high temperature whereby the $CO_2$ is converted into $2CO$, and simultaneously producing a further amount of $CO$ from a second gas producing body, and mixing all of the gases.

12. A method of producing $CO$ gas substantially free from nitrogen, which consists in disassociating a gas producing body to set free $CO$ and $CO_2$, washing these gases, passing these gases through a body of carbonaceous material heated to and maintained at a high temperature by the action of electric currents between electrodes so disposed as to use the carbonaceous material as a resistance medium, whereby the carbon dioxid of the gases of combustion are disassociated to form carbon monoxid therefrom, together with a fresh amount of carbon monoxid from the carbonaceous material.

13. A method of producing $CO$ gas substantially free from nitrogen, which consists in disassociating a gas producing body to set free $CO$ and $CO_2$, washing these gases, passing these gases through a body of carbonaceous material raised to and maintained at a high temperature in zones therein by the action of electric currents between electrodes so disposed as to use the carbonaceous material as a resistance medium, regulating the temperature of such zones, whereby the carbon dioxid of the hot waste gases of combustion are disassociated to form carbon monoxid therefrom, together with a fresh amount of carbon monoxid from the carbonaceous material.

In testimony whereof, I affix my signature, in the presence of two witnesses.

GEORGE HILLARD BENJAMIN.

Witnesses:
 Helen E. Koelsch,
 Lester C. Taylor.